United States Patent [19]

Freedman

[11] Patent Number: 5,186,782
[45] Date of Patent: Feb. 16, 1993

[54] METHOD FOR HIGH SPEED LABELLING OF DEFORMABLE SUBSTRATES

[75] Inventor: Melvin S. Freedman, Beachwood, Ohio

[73] Assignee: Avery Dennison Corporation, Pasadena, Calif.

[21] Appl. No.: 599,307

[22] Filed: Oct. 17, 1990

[51] Int. Cl.⁵ .................. B29C 47/00; B32B 31/14
[52] U.S. Cl. .................... 156/244.11; 156/244.14; 156/244.24; 156/247; 156/249; 264/177.17; 264/177.19
[58] Field of Search .................. 156/244.11, 244.14, 156/244.24, 247, 249; 264/177.17, 177.19

[56] References Cited

U.S. PATENT DOCUMENTS

| | | | |
|---|---|---|---|
| Re. 32,929 | 5/1989 | Ewing | 428/220 |
| 2,718,666 | 9/1955 | Knox | 264/177.17 |
| 2,920,352 | 1/1960 | Miller et al. | 264/177.17 |
| 3,036,945 | 5/1962 | Souza | |
| 3,100,722 | 8/1963 | Herrmann | |
| 3,154,461 | 10/1964 | Johnson | |
| 3,187,982 | 6/1965 | Underwood et al. | 156/244.14 |
| 3,354,506 | 11/1967 | Raley | |
| 3,370,951 | 2/1968 | Hausenauer | |
| 3,382,206 | 5/1968 | Karickhoff | |
| 3,468,744 | 9/1969 | Reinhart | |
| 3,515,626 | 6/1970 | Duffield | 156/244.14 |
| 3,690,909 | 9/1972 | Finley | |
| 3,841,943 | 10/1974 | Takashi et al. | 156/244.24 |
| 3,871,947 | 3/1975 | Brekken | 156/244.24 |
| 3,894,904 | 7/1975 | Cook | |
| 3,908,065 | 9/1975 | Stigen | |
| 3,924,051 | 12/1975 | Wiggins | |
| 3,936,567 | 2/1976 | Vesely | |
| 3,963,851 | 6/1976 | Toyoda | |
| 3,968,196 | 8/1976 | Wiley | |
| 3,979,000 | 9/1976 | Karabedian | |
| 4,008,115 | 2/1977 | Fairbanks | |
| 4,011,358 | 3/1977 | Roelofs | |
| 4,020,215 | 4/1977 | Michaylov | |
| 4,051,293 | 9/1977 | Wiley | |
| 4,057,667 | 11/1977 | Wiggens | |
| 4,069,934 | 1/1978 | Karabedian | |
| 4,082,880 | 4/1978 | Zboril | |
| 4,091,150 | 5/1978 | Roelofs | |
| 4,100,237 | 7/1978 | Wiley | |
| 4,118,438 | 10/1978 | Matsui | |
| 4,172,163 | 10/1979 | Magnotta | |
| 4,188,443 | 2/1980 | Mueller | |
| 4,233,367 | 11/1980 | Ticknor | |
| 4,235,341 | 11/1980 | Martin | |
| 4,242,402 | 12/1980 | Korpman | 156/244.24 |
| 4,246,058 | 1/1981 | Reed | |
| 4,254,169 | 5/1981 | Schroeder | |
| 4,331,727 | 5/1982 | Maas | |
| 4,343,851 | 8/1982 | Sheptak | |
| 4,346,855 | 8/1982 | Biggar | |
| 4,361,628 | 11/1982 | Krueger | |
| 4,377,050 | 3/1983 | Renholts | |
| 4,377,616 | 3/1983 | Ashcraft | |
| 4,379,806 | 4/1983 | Korpman | |
| 4,380,567 | 4/1983 | Shigemoto | |
| 4,386,135 | 5/1983 | Campbell | |
| 4,389,450 | 6/1983 | Schaefer | |
| 4,393,115 | 7/1983 | Yochii | |
| 4,398,985 | 8/1983 | Eagon | |
| 4,402,172 | 9/1983 | Krueger | |
| 4,405,401 | 9/1983 | Stahl | |
| 4,407,897 | 10/1983 | Farrell | |

Primary Examiner—Caleb Weston
Attorney, Agent, or Firm—Pearne, Gordon, McCoy & Granger

[57] ABSTRACT

Extruded heat-set polymeric films are die-cut into labels, dispensed past peel-back edges, and applied to deformable or squeezable workpieces after being treated differently in their lengthwise and cross directions so as to have different stiffnesses in the respective directions and achieve a tradeoff between dispensability and conformability superior to that of prior art labels of heat-set polymeric material. In one particular respect, unilayer polyethylene is treated differently in machine and cross directions to yield improved heat-set polyethylene labels.

13 Claims, 2 Drawing Sheets

U.S. PATENT DOCUMENTS

| | | |
|---|---|---|
| 4,410,582 | 10/1983 | Tsunashima . |
| 4,424,256 | 1/1984 | Christensen . |
| 4,425,410 | 1/1984 | Farrell . |
| 4,429,015 | 1/1984 | Sheptak . |
| 4,438,175 | 3/1984 | Ashcraft . |
| 4,463,861 | 8/1984 | Tsubone . |
| 4,464,443 | 8/1984 | Farrell . |
| 4,472,227 | 9/1984 | Toyoda . |
| 4,513,050 | 4/1985 | Akao . |
| 4,517,044 | 5/1985 | Arnold . |
| 4,522,887 | 6/1985 | Koebisu . |
| 4,525,416 | 6/1985 | Hammerschmidt et al. . |
| 4,528,055 | 7/1985 | Hattemer . |
| 4,529,654 | 7/1985 | Drum . |
| 4,544,590 | 10/1985 | Egan . |
| 4,551,380 | 11/1985 | Schoenberg . |
| 4,568,403 | 2/1986 | Egan . |
| 4,581,262 | 4/1986 | Karabedian . |
| 4,582,736 | 4/1986 | Duncan . |
| 4,582,752 | 4/1986 | Duncan . |
| 4,582,753 | 4/1986 | Duncan . |
| 4,585,679 | 4/1986 | Karabedian . |
| 4,617,241 | 10/1986 | Mueller . |
| 4,626,455 | 12/1986 | Karabedian . |
| 4,626,460 | 12/1986 | Duncan . |
| 4,650,721 | 3/1987 | Ashcraft . |
| 4,673,611 | 6/1987 | Crass . |
| 4,680,234 | 7/1987 | Kelch . |
| 4,702,954 | 10/1987 | Duncan . |
| 4,716,068 | 12/1987 | Seifried . |
| 4,724,186 | 2/1988 | Kelch . |
| 4,780,364 | 10/1988 | Wade . |

FOREIGN PATENT DOCUMENTS

| | | |
|---|---|---|
| 888148 | 12/1971 | Canada . |
| 1138817 | 1/1983 | Canada . |
| 060421 | 9/1982 | European Pat. Off. . |
| 1384556 | 2/1975 | United Kingdom . |
| 1404018 | 8/1975 | United Kingdom . |
| 1578517 | 11/1980 | United Kingdom . |

OTHER PUBLICATIONS

Opticite Label Films—Printing, brochure—Dow Chemical U.S.A., Films Group, Form No. 500-10-87-1085.
Soda Packaging Looks Super when Printed, information sheet, Copyright 1984, The Dow Chemical Company.
Opticite Label Film 320—information specification sheet, Copyright 1985, The Dow Chemical Company, Form No. 500-1058-85.
Opticite Label Film 330—information specification sheet, Copyright 1985, The Dow Chemical Company, Form No. 500-1059-85.
Opticite Label Film 420—information specification sheet, Copyright 1985, The Dow Chemical Company, Form No. 500-1060-85.
Opticite Label Film 410—information specification sheet, Copyright 1985, The Dow Chemical Company, Form No. 500-1061-85.
Opticite Label Film Supplier Information, information sheet, Copyright 1985, The Dow Chemical Company, Form No. 500-1062-85.
Opticite Label Film Technical Information for Printing, information sheet, Copyright 1985, The Dow Chemical Company, Form No. 500-1063-85.
New Opticite Polystyrene Label Films, brochure, The Dow Chemical Company, Form No. 500-1053-84.
Opticite Soft Drink Label Film 320, information sheet, The Dow Chemical Company, Form No. 500-1046-84.
Label Film Offers Design Options, reprint from Paper, Film & Foil Converter, Apr. 1985, The Dow Chemical Company, Form No. 500-1084-85.
Plastic Film Labels Have Vivid Graphics, High-Gloss, and Moisture Resistance, reprint from Prepared Foods, Sep., 1984, The Dow Chemical Company, Form No. 500-1084-84.
Opticite Soft Drink Label Films, brochure, Copyright 1985, The Dow Chemical Company.
Opticite Label Film 320, information sheet, Copyright 1985, The Dow Chemical Company, Form No. 500-10-46-85.
Opticite Label Film 330, information sheet, Copyright 1985, The Dow Chemical Company, Form No. 500-10-47-85.
Opticite Label Film 410, information sheet, Copyright 1985, The Dow Chemical Company, Form No. 500-10-49-85.
Opticite Label Film XU 65006.06, information sheet, Copyright 1985, The Dow Chemical Company, Form No. 500-1048-85.
Opticite Soft Drink Label Film, information sheet, Copyright 1985, The Dow Chemical Company, Form No. 500-1050-85.
Opticite Soft Drink Label Film, information sheet, Copyright 1984, The Dow Chemical Company, Form No. 500-1054-84.
Printing on Opticite Polystyrene Films, brochure, The Dow Chemical Company, Form No. 500-1076-85.
Supplier Information for Users of Opticite Films, information sheet, The Dow Chemical Company, Form No. 500-1081-85.
Commercial Dialogue, Apr. 30, 1984, "Coca-Cola and Pepsi Test Dow's Label Film".
Printing Trycite Plastic Films, brochure, Copyright 1982, The Dow Chemical Company.
Bicor Communication, Oppalyte Observations, brochure, Jul. 1, 1983, Mobil Chemical Films Division.
Hercules WT503, WT502/1S and WT502/2S, product bulletin, Hercules Incorporated, FC-17G.
Micafil 40, information sheet, DuPont Canada, Inc.
Opportunities and Requirements for Coextruded Beverage Bottle Labels, Paper by Michael C. Paddock at 1985 Coextrusion Conference, pp. 85-98.

METHOD FOR HIGH SPEED LABELLING OF DEFORMABLE SUBSTRATES

This invention relates to a method for high-speed labelling of deformable substrates such as squeeze bottles and the like, and to the manufacture of film facestocks usable in the method.

BACKGROUND OF THE INVENTION

It has long been known to manufacture and distribute pressure-sensitive adhesive stock for labels by providing a layer of face material for the label or sign backed by a layer of pressure-sensitive adhesive which in turn is covered by a release liner or carrier. The liner or carrier protects the adhesive during shipment and storage. The liner or carrier also allows for efficient handling of an array of individual labels after the labels are die-cut from the layer of face material and up to the point where the individual labels are dispensed in sequence on a labelling line. During the time from die-cutting to dispensing, the liner or carrier remains uncut and may be rolled and unrolled for storage, transit and deployment of the array of individual labels carried thereon.

In many label applications, it is desirable that the face material be a film of polymeric material which can provide properties lacking in paper, such as durability, strength, water resistance, abrasion resistance, gloss and other properties. A particular need in many labelling applications is the ability to apply polymeric-film labels at high line speeds, since to increase line speed has obvious cost-saving advantages. In the prior art, two useful polymeric materials have been biaxially-oriented polypropylene ("OPP") which is relatively inexpensive and dispenses well but is not usable on squeezable bottles and other flexible substrates, and unoriented blown-film polyethylene that is also relatively inexpensive and is usable on squeezable bottles and the like, but dispenses very poorly. In general, in the prior art, high line speeds for polymeric-film labels have not been possible in die-cut label applications, particularly those involving polymeric-film materials less costly than "vinyl," i.e., polyvinyl chloride (PVC). For example, the speed of label application lines has been limited when applying polymeric-film labelling stock less costly than PVC but still otherwise suitable for die-cut labels used on squeeze bottles or other flexible or deformable substrates. Polymeric-film label stock that is otherwise economically attractive and that is suitable for high speed dispensing has not lent itself to the labelling of flexible substrates, and polymeric-film stock that is otherwise economically attractive and that is suitable for labelling of flexible substrates has not been dispensable at high line speeds.

The heat-set labels contemplated by the methods of the present invention and the die-cut label applications to which the present invention relates are to be contrasted with shrink-films, consisting of stretched, unannealed films, sometimes used in sleeve-labelling applications wherein a sleeve or wrap of shrink film is placed around the circumference of a bottle or can or like container and heated to cause it to shrink into tight, surrounding engagement with the container. Examples of the latter are found in U.S. Pat. Nos. 4,581,262 and 4,585,679. The tendency to shrink causes such film to tend to withdraw from any borders, tending to leave exposed adhesive, a particular disadvantage in die-cut label applications since exposed adhesive is unsightly and tends to catch dust.

THE PRESENT INVENTION

The present invention opens the way to substantial cost savings in the manufacture of polymeric-film facestocks while at the same time maintaining the desirable characteristics of the film facestocks which have been used prior to this invention.

In particular, the present invention opens the way to labelling of flexible substrates at higher line speeds than have been obtainable in the past for many polymeric-film label materials, particularly those less costly and less environmentally threatening, but also less inherently conformable, than PVC. Before the present invention, these higher line speeds for flexible substrate labelling by such polymeric-film labels were not believed to be attainable because of the perceived inconsistency between (a) dispensability, generally correlated with high flexural modulus and stiffness, and (b) conformability, generally correlated with low flexural modulus and flexibility.

As already indicated, the use of PVC as the polymer of choice in the manufacture of polymer-film labels entails not only relatively high material costs, but also environmental drawbacks. These drawbacks arise form the presence of the chlorine component in the PVC polymer. Also, there is sometimes a tendency for PVC labels to shrink due to plasticizer migration, leaving an exposed ring of adhesive that is unsightly and catches dust. These considerations make it that much more desirable to accomplish labelling at high line speeds using non-chlorine-containing materials.

The invention involves the discovery or insight that providing heat-set polymeric films with relatively low stiffness (with corollary generally high stretchability or conformability) in only the cross direction allows acceptable overall conformability in many flexible substrate applications when using heat-set polymeric materials of lower inherent conformability than PVC, such as heat-set polyethylene, polystyrene, polypropylene, ethylene vinyl acetate (EVA), and copolymers and mixes thereof, provided that the substantially higher stiffness (and hence generally lesser stretchability and conformability) in the machine direction is not at too high a level. Also important is an additional insight: that the latter "not too high a level" can at the same time be high enough to allow high speed dispensing of the heat-set labels providing that the relatively low stiffness in the cross direction is not too low.

Put another way, through provision of proper differential between machine direction stiffness and cross direction stiffness, with the latter the lower of the two, a heat-set film can accomplish dispensing at substantially higher line speeds than previously achieved for the same film in many flexible substrate applications, while at the same time exhibiting acceptable overall conformability to the flexible substrates even though the film has less inherent conformability than PVC.

Mounted labels formed from prior-art heat-set films which lack sufficient conformability for flexible substrate applications typically exhibit wrinkling or "channelling" after the substrate, such as a squeezable bottle, is squeezed and then released. With the bottle in upright position, the wrinkles or "channels" typically extend horizontally inward from each side edge of the label, and are widest at the side edge, becoming progressively narrower as they extend inwardly to a point at which they disappear. In other words, the wrinkling or "channeling" appears to have a characteristic of directionality. Another insight important to the invention in its preferred aspects is the desirability of a certain orientation between relatively moving (1) labels formed from a heat-set film of differential stiffness and being dispensed or off-fed at a labelling station, and (2) bottles or other workpieces receiving labels at the labelling station and having surfaces of simple curvature and an axis or axes of curvature that is vertical when the workpiece is upright (this is typical of squeezable containers whether formed as cylindrical bottles or "front and back panel" bottles), the orientation being such that as heat-set labels are dispensed onto workpieces, the cross-direction, or direction of relatively low differential stiffness, of the portion of film forming each label is parallel to the axis or axes of curvature of the workpieces.

In one particular aspect, the invention provides an improved way of manufacturing labels formed from relatively low-cost heat-set unilayer films, and specifically polyethylene, thereby enabling the manufacture of an improvement on the type of product illustrated in the prior art in U.S. Pat. No. Re. 32,929 to Ewing.

Substantially uniaxial hot-stretching has previously been practiced in the manufacture of adhesive-coated multilayer stock for "shrink" labelling around the circumferential extent of workpieces such as bottles or cans. The stiffness of such material in the machine direction must be sufficient to allow the material to unroll properly, and the uniaxial hot-stretching presumably incidentally provides a difference in stiffness in machine and cross directions. However, such multilayer "shrink" films are hot-stretched for the purpose of providing the desired shrinking action, and are not heat-set and dimensionally stable when they are fed to the workpieces. The procedures used are not suitable for labelling with labels die-cut from heat-set film materials, and generally would not perform satisfactorily on workpieces having flexible substrates. Examples are found in U.S. Pat. Nos. 4,828,928 and 4,879,177.

Figure 1A:
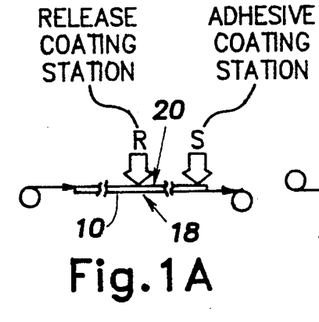
FIGS. 1A-1D schematically illustrate certain manufacturing steps related to the environment of the invention.
Figure 1B:
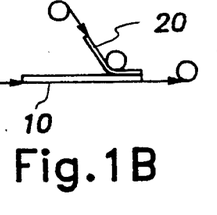

In the manufacture of label stock according to the invention, liner or carrier stock 10 (FIG. 1A-1D) may be provided. The liner or carrier stock 10 may comprise a multilayer liner made for example as disclosed in U.S. Pat. No. 4,713,273, the disclosure of which is incorporated herein by reference, or may be conventional liner or carrier consisting of a single paper or film layer which may be supplied in roll form. If it has not been previously provided with a release coating and does not itself include components to inherently generate a release surface at its adhesive-contacting face, the liner or carrier 10 may be coated with a release coating at station R, as shown in FIG. 1A. If a release coating is applied, it is dried or cured following application by any suitable means (not shown). If the liner or carrier 10 comprises a plastic extrudate, then prior to application of the release coating at station R, the formed films may be hot-stretched to provide machine direction orientation of the liner or carrier 10.

The release face of the release liner or carrier may be coated with a layer of pressure-sensitive adhesive for subsequent transfer of the adhesive to the facestock with which the liner or carrier is employed. When the facestock is combined with the liner or carrier, the adhesive is joined to the facestock. Later, the liner or carrier is removed to expose the adhesive, which now remains permanently joined to the facestock.

Thus, as indicated in FIG. 1A, adhesive may be applied at station S following drying or cure of the release coat previously applied at station R. This may be a tandem coating operation, or the adhesive coating may be on a separate coating line. Or, the adhesive may be applied at some later time prior to the combining of the release liner or carrier 10 with facestock. The combining of the liner or carrier with a facestock 20 is diagrammatically illustrated in FIG. 1B. Alternatively, the adhesive may be coated directly on the facestock 20 prior to the combining of the face stock and liner or carrier.

In some applications, the adhesive may be a heat-activated adhesive or a hot-melt adhesive, as distinguished from a pressure-sensitive adhesive, in which case there may be no need for the provision of a release coating or inherent releasability such as is required when using a pressure-sensitive adhesive.

Figure 1C:
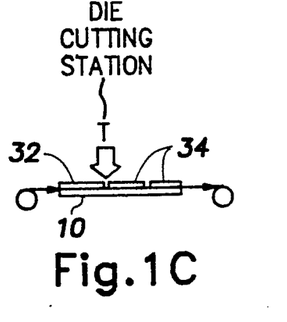
Figure 1D:
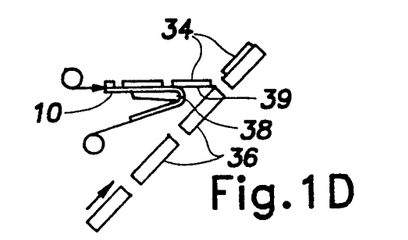

FIG. 1C diagrammatically illustrates the die-cutting of the facestock 20, at a station T, into a series of spaced pressure-sensitive labels 34 carried by the release liner or carrier 10. This step may be performed by rotary cutting dies in a well known manner and involves the stripping of the ladder-shaped matrix (not shown) of waste or trim surrounding the formed labels when they are die cut (the "rungs" of the ladder representing the spacing between successive labels). The labels then remain on the liner in spaced relation with each other, as shown. Or, the die cutting may be a butt-cutting operation in which the labels are not spaced, but remain adjacent each other, although disconnected, following die-cutting (and the matrix of waste material is "rungless"). FIG. 1D illustrates the application of the labels 34 to passing workpieces 36 by use of a peel-back edge 38 to dispense the labels 34 by progressively removing the liner or carrier from them to thereby expose the adhesive side 39 of the labels and project the labels into contact with passing workpieces 36. In the context of the present invention, the workpieces 36 may consitute plastic squeeze bottles or other articles which are flexible in nature and therefore require labels that avoid or minimize the natural tendency of labels that are adhered to such objects to wrinkle upon flexing of the substrate.

Figure 2:
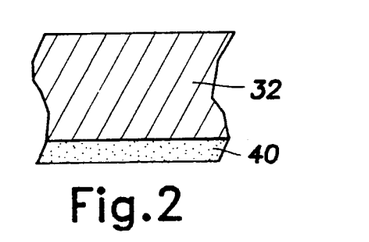
FIGS. 2-7 are a fragmentary cross sections of various facestock constructions usable in the practice of the invention.

FIG. 2 diagrammatically illustrates a single-layer facestock 32 with pressure-sensitive adhesive 40 permanently combined therewith. Such facestock could be employed as the facestock 20 in the methods or procedures at the stage illustrated at the right end of FIG. 1B or the left end of FIG. 1C. At this stage, the adhesive 40 (not shown in FIGS. 1A to 1D) may be releasably carried on the liner or carrier 10 (on or with which it may have been previously coated or combined, as by the previously mentioned coating step at station S). Alternatively, the adhesive 40 may have been directly coated on or combined with the facestock 20 prior to the combining of the facestock with the liner or carrier 10

It will be understood that the operations shown in FIGS. 1A to 1D may be done at different locations by different manufacturers, or they may be combined. For example, the steps of FIG. 1A may be performed by a liner and adhesive manufacturer, the steps of FIGS. 1B and 1C may be performed by a label manufacturer on one continuous pass rather than being interrupted by a wind/unwind sequence as illustrated, and the steps of FIG. 1D may be performed by a packager of manufactured products.

Facestock which is formed into labels is usually wound and unwound in roll form, and is therefore one form of what is known as "roll stock" or "roll facestock," and the accompanying liner or carrier is called "roll liner."

The single-layer facestock material may comprise for example low, medium or high density polyethylene. The enhancement of the performance of labels made from such facestock is an important aspect of the invention, and will be discussed more fully below.

Figure 3:
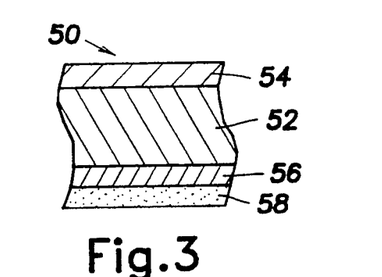
Figure 4:
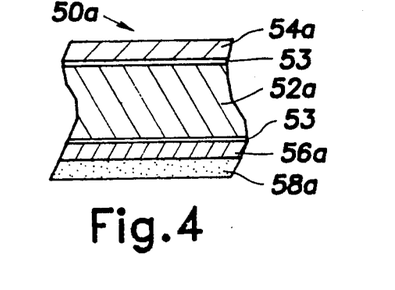

Examples of multilayer film facestocks which may be used in the invention are seen in FIGS. 3–7. In FIG. 3, a multilayer web construction, generally indicated by the reference numeral 50, comprises a coextrudate including a core layer 52, a skin layer 54 on the face side of the coextrudate, and a skin layer 56 on the inner side of the coextrudate opposite the face side. Combined on the inner side of the coextrudate is a pressure-sensitive adhesive layer 58. In FIG. 4, a multilayer web construction, generally indicated by the numeral 50a, comprises layers 52a, 54a, 56a, and 58a generally corresponding to the layers 52, 54, 56 and 58 in FIG. 3. However, in FIG. 4, tie layers 53 join the core layer 52a to the skin layers 54a and 56a.

The coextrudates of FIGS. 3 and 4 comprise polymeric-film materials, are formed by simultaneous extrusion from a suitable known type of coextrusion die, and are adhered to each other in a permanently combined state to provide a unitary coextrudate. The FIG. 3 construction is used when the materials of the core and skins are such that these layers firmly adhere or bond to each other when coextruded as adjacent film layers. The FIG. 4 construction, with the tie layers 53, is used when the core and skin materials do not sufficiently adhere or bond to each other when they are extruded together.

The presently preferred materials for skin and core layers comprise physical blends of (1) polypropylene or copolymers of polypropylene and polyethylene and (2) ethylene vinyl acetate (EVA) in weight ratios ranging from 50/50 to 60/40.

Another material for the core layers is polyethylene of low, medium or high density between about 0.915 and 0.965 specific gravity.

Inorganic fillers may be used to provide opaque film label stock. Useful fillers include calcium carbonate, titanium dioxide and blends thereof.

A presently preferred material for the core layer 54 for clear film label applications is a physical blend of (1) a copolymer of polypropylene and polyethylene and (2) ethylene vinyl acetate (EVA). For opaque film label applications, a presently preferred core layer is a physical blend of polypropylene and EVA, filled with a mixture of calcium carbonate and titanium dioxide.

A presently preferred material for the skin layers 54 and 56 is a physical blend of polypropylene and EVA for both clear and opaque label film applications. Another material for the skin layers is polyethylene vinyl acetate. The skin layers may be identical or differ in composition. For example, polyethylene vinyl acetate might be the material used for the outer skin, but polyethylene acrylic acid might be used for the inner skin for better anchorage to, say, an acrylic adhesive of choice.

Other materials for the skin layers include meltable film-forming substances used alone or in combination, such as polyethylene, polyethylene methyl acrylic acid, polyethylene ethyl acrylate, polyethylene methyl acrylate, acrylonitrile butadiene styrene polymer, polyethylene vinyl alcohol, nylon, polybutylene, polystyrene, polyurethane, polysulfone, polyvinylidene chloride, polypropylene, polycarbonate, polymethyl pentene, styrene maleic anhydride polymer, styrene acrylonitrile polymer, ionomers based on sodium or zinc salts of ethylene/methacrylic acid, polymethyl methacrylates, cellulosics, fluoroplastics, polyacrylonitriles, and thermoplastic polyesters.

Figure 5:
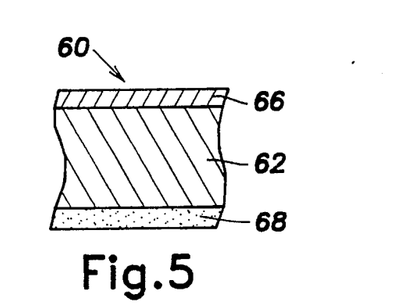

While the foregoing examples of facestocks have employed skin layers on each side of the core, there are instances where a skin layer is employed only on the outer side of the construction, such as the construction 60 shown in FIG. 5, which employs the single skin layer 66 on the outer side of a core layer 62. In this instance, the pressure-sensitive adhesive layer 68 is directly adjacent the core layer.

Figure 6:
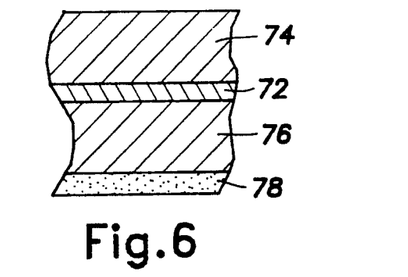
Figure 7:
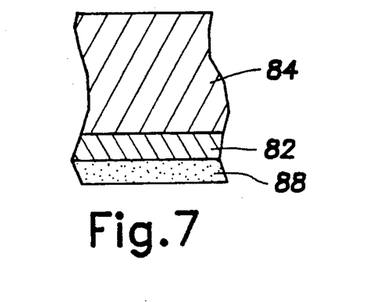

Still other multilayer constructions may be employed according to the present invention. For example, as shown in FIG. 6, the film may comprise a relatively thin core layer 72 made of a material which is so stiff that the core layer contributes the majority of the stiffness of the composite film, or at least contributes significantly thereto, even though the core layer represents only a small fraction of the total thickness of the film. Relatively thick skin layers 74, 76 are provided on the outer and inner sides of the core layer, as shown in FIG. 6, or the film may even comprise only a core layer 82 with a single skin layer 84, as seen in FIG. 7. A layer 78 or 88 of pressure-sensitive construction is combined with the construction, as seen. Additional tie layers (not shown) may also be provided where film incompatibility calls for the same, similarly to the provision of tie layers 53 in the facestock of FIG. 4, or the material of the thicker layer or layers may be "doped" with enough of the material of the thinner core layer to promote good bonding of the layers, or other bond-promoting arrangements may be used.

A candidate material for the thin stiff core layer 72 is polystyrene, which is capable of providing the majority of film stiffness when used in conjunction with far more flexible outer layer materials, such as polyethylene of low, medium or high, density which are "doped" with sufficient polystyrene to provide a good bond. These outer layer materials may be provided with additional additives to promote printability as required.

Figure 8A:
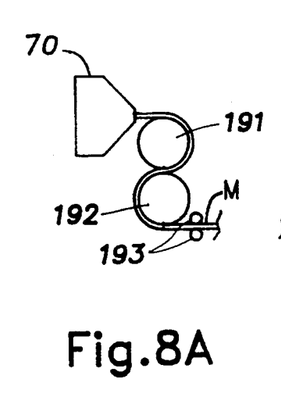
FIGS. 8A-8C schematically illustrate cast-film extrusion and ensuing line processes pertinent to the invention.

From a method standpoint, one or more charges of film-forming resin may be extruded or coextruded to form an extrudate. Thus, one or more charges may be prepared for extrusion or coextrusion through a coextrusion die 70 and flat film casting, as schematically illustrated in FIG. 8A. The extruded film is cast on a first cooling roll 191, continues around a second cooling roll 192, and is advanced by pull-off rolls 193.

Figures 8B, 8C:
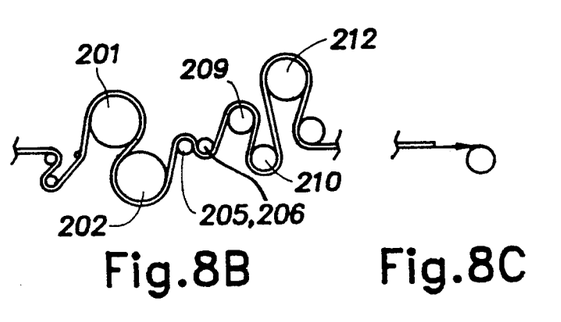

FIG. 8B illustrates a hot-stretching station at which the Gurley stiffness of the flat stock M is increased in the machine direction. After passing around a pair of pre-heat rolls 201, 202 which heat the stock above its glass transition temperature, the stock is stretched at the reach between the pre-heat rolls and the pull-roll pair 205, 206, the latter rotating at a multiple of the speed of the pre-heat rolls, corresponding to the stretch ratio, say 5 to 1. The stock then passes over the annealing rolls 209, 210 at which it is annealed or heat-set, and finally passes over the chill roll 212 to complete the hot-stretch operation. The stock may then be taken up in roll form as seen in FIG. 8C.

Multilayer facestock constructions that include tie layers may be formed by coextruding the tie layers along with the other film layers.

Figure 9:
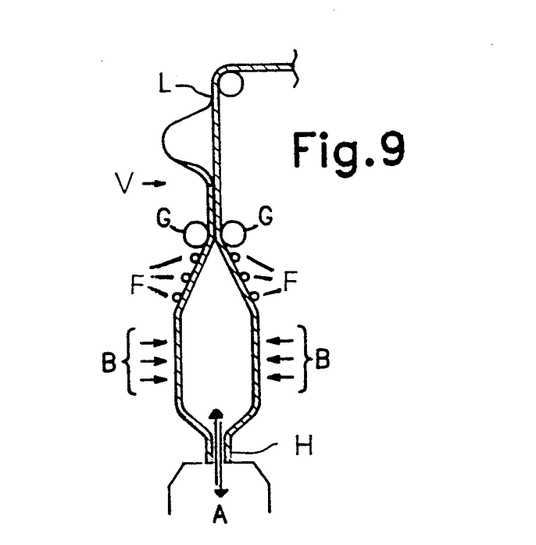
FIG. 9 schematically illustrates blown-film extrusion and ensuing line processes pertinent to the invention.

Rather than extruding the multilayer facestock films or webs described above through cast film extrusion, that is, through flat dies as schematically indicated in FIG. 8A, the charge or charges for the one or more layers can in a known manner be extruded or coextruded by blown film extrusion, that is by extrusion (preferably vertically) through circular dies, one of which is shown schematically in FIG. 9, so that the molten facestock extrudate H coming out of the die has an initially thin-stemmed hollow cylindrical shape (shown in cross-section) rather than a flat shape. In blown film extrusion, the initially thin-stemmed molten shape is blown out at a vertical location and to a degree determined by process conditions, and freezes in its expanded condition to thereby become transformed into a tubular shape of considerably increased diameter, as indicated in FIG. 9. The soft extruded cylindrical shape is supported and caused to expand by air fed through the central portions of the die into the interior of the shape. This air may be recirculated back through the die to provide a constant supply of cool air, thereby accomplishing "internal bubble cooling" of the extruded material, as indicated by the arrows A. Cooling may also be provided by air directed from nozzles surrounding the exterior of the cylinder, as indicated by the arrows B.

In such blown film extrusion operations, the cooled stock may be flattened from its tubular shape as by passing between guide rolls F and the nip of driving pinch rolls G which increase the rate of vertical travel of the film so that hot stretching in the machine direction occurs or is increased on the approach side of the rolls G. The film may then be slit on one side and unfolded into a single flat layer L, as indicated schematically beginning at station V in FIG. 9. The film may then be heat-set or annealed in a manner similar to that illustrated in the right hand portion of FIG. 8B, and then taken up in roll form in a manner similar to that illustrated in FIG. 8C.

It will be understood that when blown film extrusion is used in the practice of the invention, a significant portion of stretch in the machine direction occurs while the film is below its melting point (and above its glass transition temperature), for example by reason of rapid take-up by the rolls G, to thereby hot-stretch the film in the machine direction, and hot-stretching in the machine direction always exceeds such hot-stretching, if any, as occurs in the cross direction, so that there is always a differential favoring the machine direction in the hot-stretching of the film, with the result that the film is preferentially stiffened in the machine direction, and has a relatively low stiffness in the cross direction. In other words, hot stretching in the cross direction may or may not occur, but in any event if there is any degree of hot stretching in the cross direction, that degree will be exceeded by the degree of hot stretching in the machine direction, leaving the film in the cross direction with a relatively low degree of stiffness.

All the techniques and all the single-layer or multilayer films described above may be used in the practice of the invention in one or the other of its aspects. According to either the single-layer or multilayer film aspect of the invention, the extruded film is differentially treated in the machine and cross directions, as by hot stretching in the machine direction but not in the cross direction, or by hot stretching more in the machine direction than in the cross direction, or by otherwise differentially treating the film with respect to its machine and cross directions, so that in the machine direction the film has sufficient stiffness to allow it to dispense properly past a peel-back edge, over which the liner is stripped, at high speeds, preferably at least 500 pieces per minute, and more preferably at 550 pieces per minute, while the stiffness of the film in the cross direction is substantially less than that in the machine direction and is compatible with overall conformability of the facestock on a flexible substrate. As a result, the facestock is both dispensable at a high rate and usable in flexible substrate applications.

According to the invention, the stiffness in the machine direction should be from about 20 Gurley to 45 Gurley, and preferably at least 30 Gurley, and even more preferably in the mid-thirties in Gurley value. (Stiffness is measured per TAPPI Gurley stiffness test T-543.) The stiffness in the cross direction should be substantially less, so that the Gurley value in the cross direction is less than 0.75 times the machine direction Gurley, or more preferably less than 0.6 times the machine direction Gurley, or even more preferably less than 0.5 times the machine direction Gurley. In general, at a given Gurley value in the machine direction, overall conformability tends to increase as the ratio of cross direction Gurley to machine direction Gurley becomes smaller. However, if the ratio becomes too small, dispensability will be adversely affected. Even though a film may have a relatively high Gurley value in the machine direction, too small a Gurley value in the cross direction allows the film to tend to collapse transversely as the film passes the peel-back edge, to a point where dispensability becomes unreliable.

The foregoing ranges of Gurley values are generally achievable in the film thicknesses that are typical of labelling applications, say 2 to 4 mils.

The "front and back panel" bottles or workpieces have front and back panels that are surfaces of simple curvature, the axes of curvature of which are vertical when the workpiece is upright. In accordance with the preferred practice of the invention, it is to be noted that the workpieces 36 are fed past the labels being dispensed in such a manner that the direction of relatively low stiffness of the labels, i.e., the cross direction of the line in this instance, is parallel to the axes of curvature of the workpieces, which are therefore seen end-on in FIG. 1D. This is the preferred orientation from the standpoint of maximizing label conformability.

In one example of the invention (Example 1), a non-chlorine-containing facestock film was formed by cast film extrusion as illustrated in FIG. 8A, and was then heated, stretched in the machine direction only, and heat-set or annealed, as illustrated in FIG. 8B. The final overall thickness of the film was 3.5 mils. The particular film as formed comprised a core layer 2.8 mils thick of a physical blend of (1) a copolymer of polypropylene and polyethylene and (2) EVA, and skin layers each 0.35 mils thick of a physical blend of polypropylene and EVA. A draw ratio of 5:1 was used, so that hot stretching in the machine direction was 5:1 while there was essentially no stretching in the cross direction, resulting in a Gurley stiffness for the heat-set film of 35 in the machine direction and 15 in the unstretched cross direction. The film was combined with a psa-coated release liner in a manner similar to that shown in FIG. 1B, the adhesive thereby transferring to the film. Labels were die-cut from the film in a manner similar to that shown in FIG. 1C, leaving the labels spaced from each other as shown. The width of the labels was 2.25 inches extending in the machine direction and the height of the labels was 8 inches extending in the cross direction. The stiffness of the film in the machine direction allowed the labels to be dispensed onto typical "front and back panel" squeeze bottles of 10 oz. size at a line speed of 500 bottles per minute (more than 8 per second, a very high labelling rate for labelling squeeze bottles or other flexible substrates. The bottles were 8.25 inches high and were approximately oval in cross-section, with a major diameter of 3.125 inches and a minor diameter of 2 inches. Despite the high speed dispensability of the labels, their relatively low Gurley in the machine direction (with corollary generally high stretchability or conformability) allowed them to continue to conform well when the bottles on which they were applied were squeezed and then released. The Gurley stiffnesses of 35 in the machine direction and 15 in the cross direction for this example will be seen to be well within the ranges and relationships regarding stiffness values in the machine and cross directions given above.

In a second example of the invention (Example 2), a core material was formed from the same blend as in Example 1, and under the same conditions and procedures, but with a proportion of EVA at the top of the preferred range mentioned above. Following hot-stretching and heat-setting, the Gurley stiffness was 30 in the machine direction and 15 in the cross direction. Performance was satisfactory; the conformability of the film was slightly better and the dispensability slightly poorer than in Example 1.

In a third example of the invention (Example 3), a core material was formed from the same blend as in Example 1, and under the same conditions and procedures, but with a proportion of EVA 25% below the bottom of the preferred range mentioned above. Following hot-stretching and heat-setting, the Gurley stiffness was 40 in the machine direction and 18 in the cross direction. Dispensability was good but the conformability of the film was not equal to that of the earlier examples. Overall performance was nevertheless passable.

In a fourth example of the invention (Example 4), another non-chlorine-containing facestock film was formed by cast film extrusion as illustrated in FIG. 8A and was then heated, stretched in the machine direction only, and heat-set or annealed, as illustrated in FIG. 8B. The final overall thickness of the film was 3.4 mils. The particular film as formed comprised a core layer approximately 2.7 mils thick of a physical blend of polypropylene and ethylene vinyl acetate, together with calcium carbonate and titanium dioxide, and a skin layers each about 0.35 mils thick of a physical blend of polypropylene and EVA. A draw ratio of 5:1 in the machine direction was used, with essentially no stretching in the cross direction, resulting in the case of this film in a Gurley stiffness of 37 in the machine direction and 14 in the unstretched cross direction. A release-coated liner and pressure-sensitive adhesive were provided, and the labels were die-cut as in the previous example, and to similar dimensions, and were formed as spaced labels that were similarly applied to workpieces of the shape previously described. Again, the stiffness of the film in the machine direction allowed dispensing of labels onto typical "front and back panel" squeeze bottles of 10 oz. size at a line speed of over 500 inches per minute. Again, despite the high speed dispensability of the labels, they conformed well when the bottles on which they were applied were squeezed and then released. The Gurley stiffnesses of 37 in the machine direction and 14 in the cross direction for this example will again be seen to be well within the ranges and relationships regarding stiffness values in the machine and cross directions given above. Again, the preferred orientation between the direction of relatively low stiffness of the labels and the axes of curvature of the workpieces was maintained.

The foregoing examples demonstrate that relatively low stiffness (with corollary generally high stretchability or conformability) in only the cross direction may accomplish acceptable overall conformability in flexible substrate applications, provided that the substantially higher stiffness (and hence generally lesser stretchability and conformability) in the machine direction is not at too high a level. The examples also demonstrate that the latter "not too high a level" can be high enough to allow high speed dispensing. As previously noted, the latter observation is subject to the proviso that the relatively low stiffness in the cross direction not be too low.

Minimum stiffness values in the cross direction necessary for dispensability have not been measured, but when poor dispensability is encountered in a particular set-up even though the Gurley value in the machine direction is, say, in the mid-thirties or high twenties, then if Gurley stiffness in the cross direction is observed to be very low, dispensability can be achieved by raising the cross direction Gurley, provided it is not raised so high as to produce a film unable to conform acceptably, as by passing the top limits for cross direction Gurley specified above.

As indicated above, an important aspect of the invention is the improvement of performance of labels made from a single-layer extrudate of the type diagrammatically illustrated in FIG. 2. Labels of this type are shown in U.S. Pat. No. 32,929 to Ewing, the disclosure of which is incorporated herein by reference. Polyethylene or the other films therein specified, and specifically extruded polyethylene films having the ranges of values of thickness, density and tensile strength therein specified (ranges of tensile strength being taken to refer to the machine direction) can be formed by cast film extrusion or blown film extrusion. By way of specific example, a low or medium density polyethylene film may be employed having physical characteristics within the ranges of values specified by Ewing and also hot-stretched and heat-set to be within the parameters relating to stiffness values and relationships set forth in the present disclosure. Because of the enhancement accomplished by the single-layer film aspects of the present invention, acceptable performance may also be accomplished when extending either or both ends of the ranges specified by Ewing by as much as 0.005, 0.01 or 0.015 grams per cc in density, 0.5, 1 or 1.5 mils in thickness (but not below about 0.5 mil total thickness), and 20, 40 or (at the upper range end) 60 kilograms per square centimeter in tensile strength.

While hot-stretching is presently the preferable means of providing differential stiffness in a film, other methods are possible within the broader concepts of the invention, for example, grooving a cast film as by use of a serrated extrusion orifice, or by laser slitting that extends partly through the film, or by linearly perforating a formed film, or by other means. The terms "directionally-stiffening" and "differentially-stiffened" are used with reference collectively to such processes, of which hot-stretching is presently preferred. To the extent that elimination of hot-stretching also eliminates or minimizes the need to anneal or heat-set the film, such step may be eliminated so long as the resulting film exhibits the characteristics of a heat-set or annealed film, i.e. is essentially devoid of "memory" of a pre-existing configuration to which a film tends to return under the influence of heat. The heat set differentially stiffened films of the present invention differ in this respect from "shrink" films of the prior art.

The foregoing description and claims generally describe the differential in stiffness in cast or blown films as favoring the machine direction as against the cross direction, instead of vice versa. This is because probably it is most "natural" to dispense labels made of cast or blown films in the machine direction of the extruded film, rather than in the cross direction. However, when the machine direction for film formation and label dispensing are different, as when cast or blown film is stretched more in the cross direction of the casting or blowing line than in the machine direction and labels cut from the film are thereafter dispensed in that cross direction, or as when extruded film is grooved transversely to the direction of extrusion rather than in the direction of extrusion and dispensed in the direction of the grooves, then "machine direction" and "cross direction" as used herein should be interpreted to refer to the direction of dispensing of labels formed from the cast or blown film.

At present, the most common dispensing method that is direction-and-stiffness-sensitive, i.e., is affected in significant measure by the degree of stiffness in the direction of movement of labels being dispensed, is dispensing past a peel-back edge. However the use of other direction-and-stiffness-sensitive dispensing methods are contemplated by the invention, including those somewhat less direction-and-stiffness-sensitive than a peel-back edge, such as for example systems shown in U.S. Pat. Nos. 4,217,164 and 4,303,461 wherein a split backing is pulled apart as it is advanced to initiate label dispensing with or without prior removal of the surrounding matrix of waste facestock material.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A method for the labelling of workpieces that present deformable substrates to which die-cut heat-set polymeric-film labels are applied at high speeds by a labelling machine comprising the steps of extruding in film form a charge of polymeric material for label stock, hot-stretching and heat-setting said extruded film, the degree of hot-stretching in the cross direction being zero or greater, said step of hot-stretching including selecting a differentiation between hot-stretching in the machine direction and hot-stretching in the cross direction such that the degree of hot-stretching in the machine direction substantially exceeds the degree of hot-stretching in the cross direction, such that the degree of hot-stretching in the machine direction stiffens the heat set-film to a stiffness of between about 20 and 45 Gurley, and such that stiffness of the heat-set film in the cross direction is less than 0.75 times the machine direction stiffness, combining said hot-stretching heat-set film with an adhesive layer and a carrier, die-cutting said film into a series of individual heat-set-polymeric-film labels carried on said carrier, and dispensing said heat-set-polymeric-film labels past a peel-back edge and onto workpieces that present deformable substrates on which the labels are applied at a higher line speed while maintaining conformability than is achievable for the same film on the same deformable substrates using the same labelling machine, but without such machine and cross direction stiffness differential.

2. A method as in claim 1 in which said heat-set-polymeric-film labels are dispensed past said peel-back edge at a speed of at least 500 labels per minute.

3. A method as in claim 1 in which said step of hot-stretching includes selecting a differentiation between hot-stretching in the machine direction and hot-stretching in the cross direction such that stiffness of the heat-set film in the cross direction is less than 0.6 times the machine direction stiffness.

4. A method as in claim 1 in which said step of hot-stretching includes selecting a differentiation between hot-stretching in the machine direction and hot-stretching in the cross direction such that stiffness of the heat-set film in the cross direction is less than 0.5 times the machine direction stiffness.

5. A method as in claim 1 in which said step of dispensing said labels onto workpieces includes the step of placing said labels on surfaces of simple curvature on the workpieces and further includes the step of moving said labels and workpieces relatively to each other such that the cross-direction of the hot-stretched-heat-set film from which each label is formed is parallel to the axis or axes of curvature of the workpiece surface to which the label is applied.

6. A method for the labelling of workpieces that present deformable substrates to which die-cut heat-set polymeric-film labels are applied at high lines speeds comprising the steps of extruding in film form a charge of polymeric material for label stock, hot-stretching and heat-setting said extruded film, the degree of hot-stretching in the cross direction being zero or greater, said step of hot-strenching including selecting a differentiation between hot-stretching in the machine direction and hot-stretching in the cross direction such that the degree of hot-stretching in the machine direction substantially exceeds the degree of hot stretching in the cross direction, such that the degree of hot-stretching in the machine direction stiffens the heat-set film sufficiently to allow it to dispense past a peel-back edge at a speed of at least 500 labels per minute, and such that stiffness of the heat-set film in the cross direction is substantially less than that in the machine direction and compatible with stretchability and conformability of the film on a flexible substrate, combining said heat-set film with an adhesive layer and a carrier, die-cutting said film into a series of individual heat-set polymeric-film labels carried on said carrier, and dispensing said heat-set-polymeric-film labels past a peel-back edge and onto workpieces that present deformable substrates on which the labels are applied.

7. A method as in claim 6 in which said step of hot-stretching includes selecting a differentiation between hot-stretching in the machine direction and hot-stretching in the cross direction such that the stiffness of said heat-set film in the machine direction exceeds that in the cross direction by at least about 10 Gurley, and the stiffness of said heat-set film is between about 10 and 20 Gurley in the cross direction and between about 20 and 45 Gurley in the machine direction.

8. A method as in claim 7 in which said step of hot-stretching includes selecting a differentiation between hot-stretching in the machine direction and hot-stretching in the cross direction such that the stiffness of said heat-set film in the machine direction exceeds that in the cross direction by at least about 15 Gurley, and the stiffness of said heat-set film is between about 12 and 20 Gurley in the cross direction and between about 30 and 40 Gurley in the machine direction.

9. A method as in claim 6 in which said step of dispensing said labels onto workpieces includes the step of placing said labels on surfaces of simple curvature on the workpieces and further includes the step of moving said labels and workpieces relatively to each other such that the cross-direction of the heat-set polymeric film from which each label is formed is parallel to the axis or axes of curvature of the workpiece surface to which the label is applied.

10. A method for the labelling of workpieces that present deformable substrates to which die-cut heat-set polymeric-film labels are applied at high line speeds by a labelling machine comprising the steps of extruding a film of polyethylene in film form, hot-stretching and heat-setting said extruded polyethylene film, the degree of hot-stretching in the cross direction being zero or greater, said step of hot-stretching including selecting a differentiation between hot-stretching in the machine direction and hot stretching in the cross direction such that the degree of hot-stretching in the machine direction substantially exceeds the degree of hot-stretching in the cross direction, such that the degree of hot-stretching in the machine direction stiffens the heat-set film to a stiffness of between about 20 and 45 Gurley, and such that stiffness of said heat-set film in the cross direction is less than 0.75 times the machine direction stiffness, combining said heat-set hot-stretched film with an adhesive layer and a carrier, die-cutting said hot-stretched heat-set film into a series of individual polymeric-film labels carried on said carrier, and dispensing said heat-set-polymeric-film labels past a peel-back edge and onto workpieces that present deformable substrates on which the labels are applied at a higher line speed while maintaining conformability than is achievable for the same film on the same deformable substrates using the same labelling machine, but without such machine and cross direction stiffness differential.

11. A method for the labelling of workpieces that present deformable substrates to which die-cut heat-set polymeric-film labels are applied at high line speeds by a labelling machine comprising the steps of extruding in film form a charge of polymeric material for label stock, differentially stiffening said extruded film, the degree of stiffening in the cross direction being zero or greater, said step of differentially stiffening including selecting a differentiation between stiffening in the machine direction and stiffening in the cross direction such that the degree of stiffening in the machine direction substantially exceeds the degree of stiffening in the cross direction, such that the degree of stiffening in the machine direction stiffens the film to a stiffness of between about 20 and 45 Gurley, and such that stiffness in the cross direction is less than 0.75 times the machine direction stiffness, combining said differentially-stiffened film in heat-set condition with an adhesive layer and a carrier, die-cutting said heat-set film labels carried on said carrier, and dispensing said labels by direction-and-stiffness-sensitive means onto workpieces that present deformable substrates on which the heat-set labels are applied at a higher line speed while maintaining conformability than is achievable for the same film on the same deformable substrates using the same labelling machine, but without such machine and cross direction stiffness differential.

12. A method as in claim 11 in which said step of differentially stiffening said extruded film comprises hot-stretching said film.

13. A method as in claim 12 in which said direction-and-stiffness-sensitive means comprises a peel-back edge.

* * * * *